United States Patent
Ford et al.

(10) Patent No.: US 7,652,113 B2
(45) Date of Patent: Jan. 26, 2010

(54) POLYETHYLENE COPOLYMERS HAVING LOW N-HEXANE EXTRACTABLE

(75) Inventors: Randal Ray Ford, Longview, TX (US); Richard Kingsley Stuart, Jr., Longview, TX (US)

(73) Assignee: Westlake Longview Corporation, Houston, TX (US)

( * ) Notice: Subject to any disclaimer, the term of this patent is extended or adjusted under 35 U.S.C. 154(b) by 1118 days.

(21) Appl. No.: 10/465,194

(22) Filed: Jun. 19, 2003

(65) Prior Publication Data

US 2003/0212219 A1 Nov. 13, 2003

Related U.S. Application Data

(60) Division of application No. 09/917,307, filed on Jul. 27, 2001, now Pat. No. 6,608,152, which is a continuation of application No. 09/386,547, filed on Aug. 31, 1999, now abandoned.

(60) Provisional application No. 60/105,786, filed on Oct. 27, 1998.

(51) Int. Cl.
C08F 210/00 (2006.01)
C08F 10/14 (2006.01)

(52) U.S. Cl. .................................. 526/348; 526/348.5

(58) Field of Classification Search ................. 526/348, 526/348.5, 352
See application file for complete search history.

(56) References Cited

U.S. PATENT DOCUMENTS

| | | |
|---|---|---|
| 2,996,459 A | 8/1961 | Andersen et al. |
| 3,113,115 A | 12/1963 | Ziegler et al. |
| 3,184,416 A | 5/1965 | Mottus |
| 3,336,278 A | 8/1967 | Ploetz et al. |
| 3,440,237 A | 4/1969 | Mottus |
| 3,594,330 A | 7/1971 | Delbouille et al. |
| 3,644,318 A | 2/1972 | Diedrich et al. |
| 3,676,415 A | 7/1972 | Diedrich et al. |
| 3,709,853 A | 1/1973 | Karapinka |
| 3,917,575 A | 11/1975 | Matsuura et al. |
| 4,003,712 A | 1/1977 | Miller |
| 4,011,382 A | 3/1977 | Levine et al. |
| 4,012,573 A | 3/1977 | Trieschmann et al. |
| 4,105,847 A | 8/1978 | Ito et al. |
| 4,148,754 A | 4/1979 | Strobel et al. |
| 4,187,385 A | 2/1980 | Iwao et al. |
| 4,211,670 A | 7/1980 | Vandenberg |
| 4,256,866 A | 3/1981 | Karayannis et al. |
| 4,293,673 A | 10/1981 | Hamer et al. |
| 4,296,223 A | 10/1981 | Berger |
| 4,298,713 A | 11/1981 | Morita et al. |
| 4,302,565 A | 11/1981 | Goeke et al. |
| 4,302,566 A | 11/1981 | Karol et al. |
| 4,311,752 A | 1/1982 | Diedrich et al. |
| 4,331,789 A | 5/1982 | Hawley |
| 4,363,904 A | 12/1982 | Fraser et al. |
| 4,387,202 A | 6/1983 | Fable et al. |
| 4,481,301 A | 11/1984 | Nowlin et al. |
| 4,543,399 A | 9/1985 | Jenkins, III et al. |
| 4,597,920 A | 7/1986 | Golike |
| 4,659,685 A | 4/1987 | Coleman et al. |
| 4,695,558 A | 9/1987 | Albizzati et al. |
| 4,882,400 A | 11/1989 | Dumain et al. |
| RE33,683 E | 9/1991 | Allen et al. |
| 5,055,535 A | 10/1991 | Spitz et al. |
| 5,075,271 A | 12/1991 | Miro |
| 5,118,757 A | 6/1992 | McCullough, Jr. |
| 5,139,986 A | 8/1992 | Cook et al. |
| 5,191,052 A | 3/1993 | Welborn, Jr. |
| 5,256,428 A * | 10/1993 | Lustig et al. ............... 426/127 |
| 5,258,475 A | 11/1993 | Kissin |
| 5,296,430 A | 3/1994 | Funabashi et al. |
| 5,352,749 A | 10/1994 | DeChellis et al. |
| 5,410,002 A | 4/1995 | Govoni et al. |
| 5,434,010 A * | 7/1995 | Smith et al. ............... 428/520 |
| 5,470,812 A | 11/1995 | Mink et al. |
| 5,541,270 A | 7/1996 | Chinh et al. |
| 5,837,064 A | 11/1998 | Bowers |
| 6,025,448 A | 2/2000 | Swindoll |
| 6,136,930 A * | 10/2000 | Bamberger et al. ......... 526/129 |
| 6,225,423 B1 | 5/2001 | Andell et al. |
| 6,291,604 B1 | 9/2001 | Takeshima |
| 6,329,476 B1 | 12/2001 | Martin et al. |
| 2003/0212219 A1 | 11/2003 | Ford et al. |

FOREIGN PATENT DOCUMENTS

| | | |
|---|---|---|
| BE | 839380 | 9/1976 |
| CA | 991798 | 6/1976 |
| EP | 0 359 444 | 3/1990 |
| EP | 0 435 514 A2 | 7/1991 |
| EP | 0 529 977 A1 | 3/1993 |

(Continued)

OTHER PUBLICATIONS

*Chemical & Engineering News*, 1985, p. 27, vol. 63, Issue 5.
International Search Report, WO 00/24790, May 29, 2000.
Ford et al., U.S. Appl. No. 60/137,979, filed Jun. 7, 1999.
DOWLEX* 2045, Polyethylene Resin, Blown Film Resin, Aug. 2001, The Dow Chemical Company, (2001 ).
Declaration of Randal R. Ford, Nov. 2, 2006.
Technical Datasheet DOWLEX*2045, Polyethylene Resin, Blown Film Resin, Apr. 1998, The Dow Chemical Company, (1998).

(Continued)

*Primary Examiner*—William K Cheung
(74) *Attorney, Agent, or Firm*—Phan Law Group PLLC

(57) ABSTRACT

A novel process for the polymerization of olefins is provided. The process involves contacting at least one olefin with a Ziegler-Natta type catalyst in the presence of a specified compound that results in the production of polymeric products having a narrower molecular weight distribution. Also provide is a process for narrowing the molecular weight distribution of a polyolefin comprising contacting an olefin, a Ziegler-Natta catalyst and a compound specified herein. Further provided are novel polyethylenes, and films and articles produced therefrom.

4 Claims, No Drawings

FOREIGN PATENT DOCUMENTS

| | | |
|---|---|---|
| EP | 0 562 493 | 9/1993 |
| EP | 0 703 246 | 3/1996 |
| EP | 0 703 246 A1 | 3/1996 |
| GB | 851113 | 10/1960 |
| JP | 49 007075 | 2/1974 |
| JP | 5-032718 | 2/1993 |
| JP | 6-199943 | 7/1994 |
| JP | 10-060017 | 3/1998 |
| WO | 95 02630 | 1/1995 |
| WO | 95 04761 | 2/1995 |
| WO | 98 23500 | 6/1998 |
| WO | 00 24789 | 5/2000 |
| WO | 00 75202 | 12/2000 |

OTHER PUBLICATIONS

Declaration of Pere Puig, Jan. 26, 2006.
Declaration of Alejandro Gracia, Jan. 26, 2006.
Technical Datasheet HDPE High Density Polyethylene 10062E, May 1993.
Declaration of Frank Luecking, Jan. 27, 2006.
U.S. F.D.A. 21 C.F.R. § 177.1520, Apr. 1, 1997, pp. 261-273.
Seintsch & Braselman; High Molecular Weight HDPE, Machinability and Properties; "Paper, Film, & Foil Converter," Mar. 1981, pp. 41-45.
Supplemental Declaration of Frank Luecking, Mar. 20, 2007.
Opposition Against EP 1 047 717 B1, The Dow Chemical Company, Jan. 27, 2006.
Response to Dow Opposition, Eastman Chemical Company, Nov. 15, 2006.

* cited by examiner

POLYETHYLENE COPOLYMERS HAVING LOW N-HEXANE EXTRACTABLE

CROSS-REFERENCE TO RELATED APPLICATION

This application is a divisional application of, and claims priority to, application having U.S. Ser. No. 09/917,307 filed Jul. 27, 2001 now U.S. Pat. No. 6,608,152; which is a continuation of U.S. Ser. No. 09/386,547 filed Aug. 31, 1999 now abandoned, which claims priority under 35 U.S.C. § 119(e) to U.S. Provisional Application Ser. No. 60/105,786, filed Oct. 27, 1998, the entire disclosure of each are incorporated inhere by reference.

FIELD OF INVENTION

The present invention relates to a process for the polymerization of olefins having narrowed molecular weight distribution (MWD) values. Polyethylenes produced in accordance with the process of the present invention are generally characterized further by having a reduced n-hexane soluble polymeric fraction. Additionally, this invention relates to novel polyethylenes, and films and articles of manufacture produced therefrom.

BACKGROUND OF INVENTION

Catalyst systems for the polymerization of olefins are well known in the art and have been known at least since the issuance of U.S. Pat. No. 3,113,115. Thereafter, many patents have been issued relating to new or improved Ziegler-Natta type catalysts. Exemplary of such patents are U.S. Pat. Nos. 3,594,330; 3,676,415; 3,644,318; 3,917,575; 4,105,847; 4,148,754; 4,256,866; 4,298,713; 4,311,752; 4,363,904; 4,481,301 and Reissue 33,683.

These patents disclose Ziegler-Natta type catalysts that are well known as typically consisting of a transition metal component and a co-catalyst that is typically an organoaluminum compound. Optionally, used with the catalyst are activators such as halogenated hydrocarbons and activity modifiers such as electron donors.

The use of halogenated hydrocarbons with titanium-based Ziegler-Natta type polymerization catalysts in the production of polyethylene is disclosed in European Patent Applications EP A 0 529 977 A1 and EP 0 703 246 A1. As disclosed, the halogenated hydrocarbons may reduce the rate of ethane formation, improve catalyst efficiency, or provide other effects. Typical of such halogenated hydrocarbons are monohalogen and polyhalogen substitutes of saturated or unsaturated aliphatic, alicyclic, or aromatic hydrocarbons having 1 to 12 carbon atoms. Exemplary aliphatic compounds include methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, 1,2-dichloroethane, 1,2-dibromoethane, methylchloroform, perchloroethylene and the like. Exemplary alicyclic compounds include chlorocyclopropane, tetrachlorocyclopentane and the like. Exemplary aromatic compounds include chlorobenzene, hexabromobenzene, benzotrichloride and the like. These compounds may be used individually or as mixtures thereof.

It is also well known, in the polymerization of olefins, particularly where Ziegler-Natta type catalysts are employed, to utilize, optionally, electron donors. Such electron donors often aid in increasing the efficiency of the catalyst and/or in controlling the stereospecificity of the polymer when an olefin, other than ethylene, is polymerized. Electron donors, typically known as Lewis Bases, can be employed during the catalyst preparation step, referred to as internal electron donors, or during the polymerization reaction when the catalyst comes into contact with the olefin or olefins, referred to as external electron donors.

The use of electron donors in the field of propylene polymerization is well known and is primarily used to reduce the atactic form of the polymer and increase the production of the iosotactic polymers. However, while improving the production of isotactic polypropylene, electron donors tend, generally, to reduce the productivity of the Ziegler-Natta type catalyst.

In the field of ethylene polymerization, where ethylene constitutes at least about 50% by weight of the total monomers present in the polymer, electron donors are utilized to control the molecular weight distribution (MWD) of the polymer and the activity of the catalyst in the polymerization medium. Exemplary patents describing the use of internal electron donors in producing polyethylene are U.S. Pat. Nos. 3,917,575; 4,187,385, 4,256,866; 4,293,673; 4,296,223; Reissue 33,683; 4,302,565; 4,302,566; and 5,470,812. The use of an external electron donor to control molecular weight distribution is shown in U.S. Pat. No. 5,055,535; and the use of external electron donors to control the reactivity of catalyst particles is described in U.S. Pat. No. 5,410,002.

Illustrative examples of electron donors include carboxylic acids, carboxylic acid esters, alcohols, ethers, ketones, amines, amides, nitrites, aldehydes, alcoholates, thioethers, thioesters, carbonic esters, organosilicon compounds containing oxygen atoms, and phosphorus, arsenic or antimony compounds connected to an organic group through a carbon or oxygen atom.

The above is a partial listing of suitable electron donors. For the present invention, it is possible to use any electron donor that is suitable in a process for the polymerization of olefins.

SUMMARY OF THE INVENTION

The process of the present invention comprises polymerizing at least one olefin in the presence of both at least one Ziegler-Natta catalyst comprised of a component comprising at least one transition metal and a co-catalyst comprising at least one organometallic compound, and a sufficient amount of a specified compound to obtain an olefin homopolymer or interpolymer having a narrower molecular weight distribution than would be obtained in the absence of the specified compound. The specified compound added to the polymerization process is selected from the following:

1) An oxide of germanium, tin and lead;
2) Cyanogen ($C_2N_2$);
3) An oxide or imide of carbon of formula CE or $C_3E_2$ where E=O and NR, R is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms;
4) A sulfur, selenium, or tellurium containing chalcogenide of carbon, silicon, germanium, tin and lead;
5) A chalcogenide of carbon, silicon, germanium, tin and lead containing more than one chalcogen;

6) A chalcogenide imide of carbon, silicon, germanium, tin and lead having the formula C(E)(X) where E=O, S, Se, Te, or NR; X=NR' where R and/or R' is hydrogen, a halogen, an alkyl group containing up to 50 non-hydrogen atoms, an aryl group containing up to 50 non-hydrogen atoms, a silyl group containing up to 50 non-hydrogen atoms, or a boryl group containing up to 50 non-hydrogen atoms;

7) A chalcogenyl halide or imidohalide of carbon, silicon, germanium, tin and lead of the formula $C(E)X_2$ where E=O, S, Se, Te, and NR; R is hydrogen, a halogen, an alkyl group containing up to 50 non-hydrogen atoms, an aryl group containing up to 50 non-hydrogen atoms, a silyl group containing up to 50 non-hydrogen atoms, or a boryl group containing up to 50 non-hydrogen atoms; and X is a halogen;

8) An elemental form of phosphorus, arsenic, antimony and bismuth;

9) An oxide of nitrogen, phosphorus, arsenic, antimony and bismuth;

10) A nitrogen oxoacid or salt containing the anion thereof;

11) A halide of the formula $E_nX_m$, where E is nitrogen, phosphorus, arsenic, antimony or bismuth and X is a halogen or pseudohalogen, n=1 to 10, and m=1 to 20;

12) A chalcogenide or imide of nitrogen, phosphorus, arsenic, antimony and bismuth of the general formula $E_nY_m$, where E=N, P, As, Sb, and Bi; Y=S, Se, Te, Po and NR; n=1 to 10; m=1 to 40; and R is hydrogen, a halogen, an alkyl group containing up to 50 non-hydrogen atoms, an aryl group containing up to 50 non-hydrogen atoms, a silyl group containing up to 50 non-hydrogen atoms, or a boryl group containing up to 50 non-hydrogen atoms;

13) A chalcogenyl or imido compound of nitrogen, phosphorus, arsenic, antimony and bismuth having the formula $E_nY_mX_q$, where E=N, P, As, Sb and Bi; Y=O, S, Se, Te and NR; X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms; n=1 to 20; m=1 to 40; q=1 to 40; and R is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms;

14) An interpnictogen;

15) A phosphazene of the general formula $(NPR_2)_x$ wherein R=halogen, or alkyl or aryl group containing up to 50 non-hydrogen atoms, and x is at least 2;

16) A compound of the general formula $A(E)X_3$ where A=P, As, Sb, and Bi; E=NR or $CR_2$, R is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms; and X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms;

17) A pnictogen hydride;

18) An elemental form of oxygen, sulfur, selenium, and tellurium;

19) An interchalcogen;

20) A compound containing one or more chalcogens and one or more halogens of formula $E_nX_m$ where E=O, S, Se, and Te; X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms, n=1 to 10, m=1 to 20;

21) A compound of general formula $EOX_2$ where E=O, S, Se, and Te; X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms;

22) A compound of general formula $EOX_4$ where E=S, Se, and Te; X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms;

23) A compound of general formula $EO_2X_2$ where E=S, Se, and Te; X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms;

24) A Sulfur-Nitrogen compound;

25) A compound of the formula $S(NR)_nX_m$ where n=1 to 3; m=0 to 6; X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms; and R is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms;

26) A sulfur oxoacid, peroxoacid, and salts containing the anions thereof;
27) A selenium oxoacid, peroxoacid, and salts containing the anions thereof;
28) A tellurium oxoacid, peroxoacid, and salts containing the anions thereof;
29) A chalcogen hydride;
30) An elemental form of fluorine, chlorine, bromine, iodine, and astatine;
31) An interhalogen, salts containing their cations, and salts containing the anions thereof;
32) A salt containing polyhalide cations and/or anions;
33) A homoleptic or heteroleptic halogen oxide, salts containing the cations thereof, and salts containing the anion thereof;
34) An oxoacid and salts containing the anions thereof;
35) A hydrogen halide;
36) $NH_4F$, $SF_4$, $SbF_3$, $AgF_2$, $KHF_2$, $ZnF_2$, $AsF_3$, and salts containing the $HF_2^-$ anion;
37) A hydrohalic acid;
38) A He, Ne, Ar, Kr, Xe, and Rn oxide, salts containing the cations thereof, and salts containing the anions thereof;
39) A He, Ne, Ar, Kr, Xe, and Rn halide, salts containing the cations thereof, and salts containing the anions thereof;
40) A He, Ne, Ar, Kr, Xe, and Rn chalcogenyl halide, salts containing the cations thereof, and salts containing the anions thereof;
41) A product obtained by reacting a material selected from the group consisting of water, alcohol, hydrogen sulfide and a thiol with any of the above compounds and salts thereof containing the corresponding anion;
42) An organic peroxide;
43) Water; and
44) Mixtures thereof.

Also provided is a process for narrowing molecular weight distribution of a polymer comprising at least one or more olefin(s) comprising contacting under polymerization conditions, at least one or more olefin(s) with at least one Ziegler-Natta catalyst comprised of a component comprising at least one transition metal and a co-catalyst comprising at least one organometallic compound, and at least one of the specified compounds, wherein the specified compound is present in an amount sufficient that the molecular weight distribution of the resulting polymeric product is narrower than would be obtained in the absence of the specified compound. The specified compounds are listed hereinabove.

All mention herein to elements of Groups of the Periodic Table are made in reference to the Periodic Table of the Elements, as published in "Chemical and Engineering News", 63(5), 27, 1985. In this format, the Groups are numbered 1 to 18.

In carrying out the novel polymerization process of the present invention, there may optionally be added any electron donor(s) and/or any halogenated hydrocarbon compound(s).

Also, the present invention comprises novel polyethylene hompolymers and interpolymers. Further, the present invention comprises films and articles of manufacture produced from the novel polyethylene hompolymers and interpolymers.

DETAILED DESCRIPTION OF THE INVENTION

The present invention relates to a process for polymerizing at least one olefin in the presence of both at least one Ziegler-Natta catalyst comprised of a component comprising at least one transition metal and a co-catalyst comprising at least one organometallic compound, and a sufficient amount of a specified compound to obtain a polyolefin homopolymer or interpolymer characterized by having a molecular weight distribution (MWD) narrower than would be obtained in the absence of the specified compound. The specified compounds are listed hereinabove.

Also provided is a process for narrowing molecular weight distribution of a polymer comprising at least one or more olefin(s) comprising contacting under polymerization conditions, at least one or more olefin(s) with at least one Ziegler-Natta catalyst comprised of a component comprising at least one transition metal and a co-catalyst comprising at least one organometallic compound, and at least one of the specified compounds, wherein the specified compound is present in an amount sufficient that the molecular weight distribution of the resulting polymeric product is narrower than would be obtained in the absence of the specified compound. The specified compounds are listed hereinabove.

The polymerization of the at least one olefin herein may be carried out using any suitable process. For example, there may be utilized polymerization in suspension, in solution or in the gas phase media. All of these polymerization processes are well known in the art.

A particularly desirable method for producing polyethylene polymers according to the present invention is a gas phase polymerization process. This type process and means for operating the polymerization reactor are well known and completely described in U.S. Pat. Nos. 3,709,853; 4,003,712; 4,011,382; 4,012,573; 4,302,566; 4,543,399; 4,882,400; 5,352,749; 5,541,270; Canadian Patent No. 991,798 and Belgian Patent No. 839,380. These patents disclose gas phase polymerization processes wherein the polymerization zone is either mechanically agitated or fluidized by the continuous flow of the gaseous monomer and diluent. The entire contents of these patents are incorporated herein by reference.

In general, the polymerization process of the present invention may be effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The said gas is passed through a heat exchanger wherein the heat of polymerization is removed, compressed in a compressor and then returned to the reaction zone.

In more detail, the reactor temperature of the fluid bed process herein ranges from about 30° C. to about 150° C. In general, the reactor temperature is operated at the highest temperature that is feasible taking into account the sintering temperatures of the polymer product within the reactor.

The process of the present invention is suitable for the polymerization of at least one or more olefins. The olefins, for example, may contain from 2 to 16 carbon atoms. Included herein are homopolymers, copolymers, terpolymers, and the like of the olefin monomeric units. Particularly preferred for preparation herein by the process of the present invention are polyethylenes. Such polyethylenes are defined as homopolymers of ethylene and interpolymer of ethylene and at least one alpha-olefin wherein the ethylene content is at least about 50% by weight of the total monomers involved. Exemplary alpha-olefins that may be utilized herein are propylene, 1-butene, 1-pentene, 1-hexene, 1-heptene, 1-octene, 4-methyl-1-pentene, 1-decene, 1-dodecene, 1-hexadecene and the like. Also utilizable herein are non-conjugated dienes and olefins formed in situ in the polymerization medium. When olefins are formed in situ in the polymerization medium, the formation of polyethylenes containing long chain branching may occur.

The polymerization reaction of the present invention is carried out in the presence of a Ziegler-Natta catalyst. In the process of the invention, the catalyst can be introduced in any manner known in the art. For example, the catalyst can be introduced directly into the fluidized bed reactor in the form of a solution, a slurry or a dry free flowing powder. The catalyst can also be used in the form of a deactivated catalyst, or in the form of a prepolymer obtained by contacting the catalyst with one or more olefins in the presence of a co-catalyst.

The Ziegler-Natta catalysts utilized herein are well known in the industry. The Ziegler-Natta catalysts in the simplest form are comprised of a component comprising at least one transition metal and a co-catalyst comprising at least one organometallic compound. The metal of the transition metal component is a metal selected from Groups 4, 5, 6, 7, 8, 9 and/or 10 of the Periodic Table of the Elements, as published in "Chemical and Engineering News", 63(5), 27, 1985. In this format, the groups are numbered 1-18. Exemplary of such transition metals are titanium, zirconium, vanadium, chromium, manganese, iron, cobalt, nickel, and the like, and mixtures thereof. In a preferred embodiment the transition metal is selected from the group consisting of titanium, zirconium, vanadium and chromium, and in a still further preferred embodiment, the transition metal is titanium. The Ziegler-Natta catalyst can optionally contain magnesium and/or chlorine. Such magnesium and chlorine containing catalysts may be prepared by any manner known in the art.

The co-catalyst used in the process of the present invention can be any organometallic compound, or mixtures thereof, that can activate the transition metal component in a Ziegler-Natta catalyst in the polymerization of olefins. In particular, the organometallic co-catalyst compound that is reacted with the transition metal component contains a metal selected from Groups 1, 2, 11, 12, 13 and/or 14 of the above described Periodic Table of the Elements. Exemplary of such metals are lithium, magnesium, copper, zinc, boron, silicon and the like, or mixtures thereof.

Preferred for use herein are the organoaluminum compounds such as the trialkylaluminum compounds and dialkylaluminum monohalides. Examples include trimethylaluminum, triethylaluminum, trihexylaluminum, dimethylaluminum chloride, and diethylaluminum chloride.

The transition metal component, with or without co-catalyst, may be deposited on a carrier. In so doing, there may be used as the carrier any catalyst carrier compound known in the art. Exemplary carriers are magnesium oxides, magnesium oxyhalides and magnesium halides, particularly magnesium chloride. The catalyst, with or without the carrier, may be supported on a solid porous support, such as silica, alumina and the like.

The catalyst system may contain conventional components in addition to the transition metal component and the organometallic co-catalyst component. For example, there may be added any internal or external electron donor(s) known in the art, any halogenated hydrocarbon(s), and the like.

The Ziegler-Natta catalyst may be prepared by any method known in the art. The catalyst can be in the form of a solution, a slurry or a dry free flowing powder. The amount of Ziegler-Natta catalyst used is that which is sufficient to allow production of the desired amount of polymeric material.

The polymerization reaction is carried out in the presence of a specified compound selected from the following. It is essential that the specified compound be utilized in an amount that will be sufficient to result in the production of polyolefins characterized by having a molecular weight distribution narrower than would be obtained in the absence of utilizing the specified compound in the specified amount. The molecular weight distribution of the polyolefins herein is evidenced by the melt flow ratio (MFR) values of the polyolefins.

The compounds that are used, in amounts effective to narrow the molecular weight distribution (MWD) of the polyolefins of the present process, are as follow:

a) A compound containing an element of Group 14 (carbon, silicon, germanium, tin and lead) selected from the following:

i) An oxide of germanium, tin and lead such as GeO, $GeO_2$, SnO, $SnO_2$, PbO, $PbO_2$, $Pb_2O_3$ and $Pb_3O_4$;

ii) Cyanogen ($C_2N_2$);

iii) An oxide or imide of carbon of formula CE or $C_3E_2$ where E=O and NR, R is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms, such as CO, $C_3O_2$, CNH, CNF, CNPh, CNMe, $CNSiMe_3$, $CNBEt_2$, and CN-cyclohexyl;

iv) A sulfur, selenium, or tellurium containing chalcogenide of carbon, silicon, germanium, tin and lead such as CS, $CS_2$, CSe, CTe, $SiS_2$, $GeS_2$, $SnS_2$, $CSe_2$, and $CTe_2$;

v) A chalcogenide of carbon, silicon, germanium, tin and lead containing more than one chalcogen such as COS, COSe, CSSe, COTe, CSTe, CSeTe;

vi) A chalcogenide imide of carbon, silicon, germanium, tin and lead having the formula C(E)(X) where E=O, S, Se, Te, or NR; X=NR' where R and/or R' is hydrogen, a halogen, an alkyl group containing up to 50 non-hydrogen atoms, an aryl group containing up to 50 non-hydrogen atoms, a silyl group containing up to 50 non-hydrogen atoms, or a boryl group containing up to 50 non-hydrogen atoms, such as $C(N-cyclohexyl)_2$, CO(NMe), CS(NPh), $CSe(NCSiMe_3)$, and $CTe(NBEt_2)$;

vii) A chalcogenyl halide or imidohalide of carbon, silicon, germanium, tin and lead of the formula $C(E)X_2$ where E=O, S, Se, Te, and NR; R is hydrogen, a halogen, an alkyl group containing up to 50 non-hydrogen atoms, an aryl group containing up to 50 non-hydrogen atoms, a silyl group containing up to 50 non-hydrogen atoms, or a boryl group containing up to 50 non-hydrogen atoms; and X is a halogen, such as $COF_2$, $COCl_2$, $C_2O_2Cl_2$, $C_2O_2F_2$, $GeOCl_2$, $C(NCMe_3)Cl_2$, $C(NCl)Br_2$, $C_2O(NSiMe_3)Cl_2$, $C_2(N$-cyclohexyl$)_2Cl_2$, $Si(NPh)Cl_2$, and $Ge(NPh)F_2$;

b) A pnictogen containing compound (a pnictogen is an element of Group 15) selected from the following:
  i) Elemental forms of phosphorus, arsenic, antimony and bismuth;
  ii) An oxide of nitrogen, phosphorus, arsenic, antimony and bismuth such as NO, $NO_2$, $N_2O$, $N_2O_3$, $N_2O_4$, $N_2O_5$, $P_4O_n$ where n=6-10, AsO, $As_4O_6$ or $As_2O_3$, $As_4O_{10}$ or $As_2O_5$, $Sb_2O_3$, $Sb_2O_4$, $Sb_2O_5$, $Bi_2O_5$, and $Bi_2O_3$. Preferred for use herein is dinitrogen monoxide ($N_2O$);
  iii) A nitrogen oxoacid or salt containing the anion thereof, such as $HNO_2$, $HNO_3$, $NO_2^-$, $NO_3^-$;
  iv) A halide of the formula $E_nX_m$, where E is nitrogen, phosphorus, arsenic, antimony or bismuth and X is a halogen or pseudohalogen, n=1 to 10, and m=1 to 20, such as $NF_3$, $N_2F_4$, $NCl_3$, $PF_3$, $PF_5$, $P_2F_4$, $PCl_3$, $PCl_5$, $P_2Cl_4$, $PBr_5$, $AsF_3$, $AsF_5$, $AsCl_5$, $As_2I_2$, $SbF_3$, $SbF_5$, $SbCl_5$, $BiF_3$, $BiF_5$, $BiBr_3$, $BiI_2$, and $BiI_3$;
  v) A chalcogenide or imide of nitrogen, phosphorus, arsenic, antimony and bismuth of the general formula $E_nY_m$, where E=N, P, As, Sb, and Bi; Y=S, Se, Te, and NR; n=1 to 10; m=1 to 40; and R is hydrogen, a halogen, an alkyl group containing up to 50 non-hydrogen atoms, an aryl group containing up to 50 non-hydrogen atoms, a silyl group containing up to 50 non-hydrogen atoms, or a boryl group containing up to 50 non-hydrogen atoms, such as $P_4S_3$, $P_4S_5$, $P_4Se_5$, $P_4(NCMe_3)_n$ where n=6 to 10, $P_4(NPh)_n$ where n=6 to 10, $As_4S_3$, $As_4S_4$, $As_4S_5$, $As_4Se_3$ and $As_4Se_4$;
  vi) A chalcogenyl or imido compound of nitrogen, phosphorus, arsenic, antimony and bismuth having the formula $E_nY_mX_q$, where E=N, P, As, Sb and Bi; Y=O, S, Se, Te and NR; X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms; n=1 to 20; m=1 to 40; q=1 to 40; and R is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms, such as NOF, NOCl, NOBr, $F_3NO$, $POF_3$, $POCl_3$, $POBr_3$, $PSCl_3$, $PO(OCN)_3$, $PO(CN)_3$, $P(NPh)Cl_3$, $P(NSiMe_3)Cl_3$, $P(NPh)F_3$, $P(NPh)Br_3$, $P(NBEt_2)Cl_3$, $PSCl_3$, $AsOF_3$, $PO_2Cl$, $P(NCMe_3)_2Cl$, $P(NCMe_3)_2Me$, $As_2O_3Cl_4$, POCl, $P(NCMe_3)Cl$, $P(NPh)Cl$, $P(NSiMe_3)Me$, PSeCl, BiOCl and SbOCl;
  vii) An interpnictogen (compounds containing at least 2 elements of Group 15) such as PN, AsN;
  viii) A phosphazene of the general formula $(NPR_2)_x$ wherein R halogen, or alkyl or aryl group containing up to 50 non-hydrogen atoms, and x is at least 2;
  ix) A compound of the general formula $A(E)X_3$ where A=P, As, Sb, and Bi; E=NR or $CR_2$, R is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms; and X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms, such as $P(CH_2)Ph_3$, $P(CH_2)Me_3$, $P(CH_2)(OPh)_3$, $P(CH_2)(NMe_2)_3$, $P(CHSiMe_3)Me_3$, $P(CHBEt_2)Me_3$, $P(CHMe)Ph_3$, $P(CHPh)Ph_3$, $P(CHMe)Me_3$, $P(NCMe_3)Ph_3$, $P(NPh)Ph_3$, $P(NSiMe_3)Me_3$, $P(NCMe_3)Me_3$, $P(NCMe_3)Ph_3$, $P(NCMe_3)Cl_3$, $P(NCMe_3)Br_2Me$, $P(NBPh_2)Cl_3$, $P(NBPr_2)Et_3$, $P(NCMe_3)(OCMe_3)_3$, $As(CHMe)Ph_3$, $Sb(CHMe)Ph_3$, $As(NCMe_3)Ph_3$;
  x) A pnictogen hydride such as $H_3N$, $H_3P$, $H_3As$, $H_3Sb$, $H_3Bi$;

c) A chalcogen containing compound (a chalcogen is an element of Group 16) selected from the following:
  i) An elemental form of oxygen, sulfur, selenium, and tellurium such as $O_2$, $O_3$, $S_n$ where n=1 to 30, $Se_2$, $Se_8$, and $Te_2$. Other allotropes of these elements may also be used;
  ii) An interchalcogen (compounds containing at least 2 Group 16 elements) such as SO, $SO_2$, $SO_3$, $SeO_2$, $SeO_3$, $TeO_2$, $S_nO_2$, where n=5 to 8);
  iii) A compound containing one or more chalcogens and one or more halogens of formula $E_nX_m$ where E=O, S, Se, and Te; X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms, n=1 to 10, m=1 to 20, such as $SOCl_2$, $SO_2Cl_2$, $SOF_2$, $Se_2F_2$, $S_2Cl_2$, $S_2F_4$, $S_4Cl_4$, $S_4F_4$, $Se_2Br_2$, $S_2F_{10}$, $OF_2$, $SF_2$, $SF_4$, $SF_6$, $SeF_2$, $SeF_4$, $SeF_3$, $TeF_4$, $TeF_6$, $SCl_4$, $TeI_4$ and mixed halides such as $SF_5Cl$, $SF_3Cl$, $SO_2SbF_5$;
  iv) A compound of general formula $EOX_2$ where E=O, S, Se, and Te; X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms, such as $SOF_2$, $SOCl_2$, SOBr$_2$, SOFCl, SeOF$_2$, SeOCl$_2$, SeOBr$_2$ SOMe$_2$, SO$_2$Me$_2$, SO$_2$Ph$_2$, SO$_2$(OEt)$_2$, SO$_2$(SPh)$_2$, and SO(SiMe$_3$)$_2$;

v) A compound of general formula EOX$_4$ where E=S, Se, and Te; X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms, such as SOF$_4$, SeOF$_4$, and TeOF$_4$;

vi) A compound of general formula EO$_2$X$_2$ where E=S, Se, and Te; X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms, such as SO$_2$F$_2$, SO$_2$Cl$_2$, SO$_2$FCl, SO$_2$FBr, SeO$_2$F$_2$;

vii) A Sulfur-Nitrogen compound such as NS, NSCl, S$_3$N$_2$Cl$_2$, S$_4$N$_4$, S$_4$N$_3$Cl, S$_2$N$_2$, S$_4$N$_4$H$_2$, N$_4$S$_4$F$_4$, S$_3$N$_3$Cl$_3$, S$_4$N$_2$, NSF, S$_7$NH, SF$_5$NF$_2$, (SN)$_x$ where x is greater than 1;

viii) A compound of the formula S(NR)$_n$X$_m$ where n=1 to 3; m=0 to 6; X is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms; and R is hydrogen, a halogen, an alkyl group containing up to 50 non-hydrogen atoms, an aryl group containing up to 50 non-hydrogen atoms, a silyl group containing up to 50 non-hydrogen atoms, an alkoxy group containing up to 50 non-hydrogen atoms, an amino group containing up to 50 non-hydrogen atoms, a thiolato group containing up to 50 non-hydrogen atoms, or a boryl group containing up to 50 non-hydrogen atoms, such as CF$_3$N=SF$_2$, RCF$_2$N=SF$_2$, S(NSiMe$_3$)$_2$, S(NSiMe$_3$)$_3$, S(NCMe$_3$)$_2$, S(NCMe$_3$)$_3$, S(NSO$_2$—C$_6$H$_4$-Me)$_2$, S(NSO$_2$—C$_6$H$_4$-Me)$_3$, and S(NCH(CF$_3$)$_2$)$_3$;

ix) A sulfur oxoacid, peroxoacid, and salts containing the anions thereof, such as H$_2$SO$_3$, HSO$_3^-$, SO$_3^{2-}$, H$_2$SO$_4$, HSO$_4^-$, SO$_4^{2-}$, H$_2$S$_2$O$_3$, HS$_2$O$_3^-$, S$_2$O$_3^{2-}$, H$_2$S$_2$O$_3$, HS$_2$O$_3^-$, S$_2$O$_3^{2-}$, H$_2$S$_2$O$_4$, HS$_2$O$_4^-$, S$_2$O$_4^{2-}$, H$_2$S$_2$O$_5$, HS$_2$O$_5^-$, S$_2$O$_5^{2-}$, H$_2$S$_2$O$_6$, HS$_2$O$_6^-$, S$_2$O$_6^{2-}$, H$_2$S$_2$O$_7$, HS$_2$O$_7^-$, S$_2$O$_7^{2-}$, H$_2$S$_{n+2}$O$_6$ where n is greater than 0, HS$_{n+2}$O$_6^-$ where n is greater than 0, S$_{n+2}$O$_6^{2-}$ where n is greater than 0, H$_2$SO$_5$, HSO$_5^-$, SO$_5^{2-}$, H$_2$S$_2$O$_8$, HS$_2$O$_8^-$, S$_2$O$_8^{2-}$;

x) A selenium oxoacid, peroxoacid, and salts containing the anions thereof, such as H$_2$SeO$_3$, HSeO$_3^-$, SeO$_3^{2-}$, HSeO$_3^-$, H$_2$SeO$_4$, HSeO$_4^-$, SeO$_4^{2-}$;

xi) A tellurium oxoacid, peroxoacid, and salts containing the anions thereof, such as H$_2$TeO$_3$, HTeO$_3^-$, TeO$_3^{2-}$, H$_2$TeO$_4$, HTeO$_4^-$, TeO$_4^{2-}$;

xii) A chalcogen hydride, such as SH$_2$, SeH$_2$, TeH$_2$, SOH$_2$, SeOH$_2$, and SSeH$_2$;

d) A halogen containing compound (a halogen is an element of Group 17) selected from the following:
  i) Elemental forms of fluorine, chlorine, bromine, iodine, and astatine, such as F$_2$, Cl$_2$, Br$_2$, I$_2$, and At$_2$ or any other allotrope;
  ii) An interhalogen (compounds containing at least 2 Group 17 elements), salts containing their cations, and salts containing the anions thereof, such as ClF, ClF$_3$, ClF$_5$, BrF, BrF$_3$, BrF$_5$, IF, IF$_3$, IF$_5$, IF$_7$, BrCl$_3$, ICl, ICl$_3$, I$_2$Cl$_6$, IF$_4^+$, BrF$_2^+$, BrF$_4^+$, IF$_2^+$, IF$_6^+$, Cl$_2$F$^+$, ClF$_2^-$, ClF$_4^-$, BrF$_2^-$, BrF$_4^-$, BrF$_6^-$, IF$_2^-$, IF$_4^-$, IF$_3^-$, IF$_6^-$, IF$_8^{-2}$;
  iii) A salt containing polyhalide cations and/or anions, such as Br$_2^+$, I$_2^+$, Cl$_3^+$, Br$_3^+$, I$_3^+$, Cl$_3^-$, Br$_3^-$, I$_3^-$, Br$_2$Cl$^-$, BrCl$_2^-$, ICl$_4^-$, IBrCl$_3^-$, I$_2$Br$_2$Cl$^-$, I$_4$Cl$^-$, I$_5^+$, ICl$_2^+$, IBrCl$^+$, IBr$_2^+$, I$_2$Cl$^+$, I$_2$Br$^+$, I$_2$Cl$^-$, IBr$_2$, ICl$_2^-$, IBCl$^{-2}$, IBrF$^-$, I$_5^-$;
  iv) A homoleptic or heteroleptic halogen oxide, salts containing the cations thereof, and salts containing the anion thereof, such as FClO$_2$, ClO$_2^+$, F$_2$ClO$_2^-$, F$_3$ClO, FClO$_3$, F$_3$ClO$_2$, FBrO$_2$, FBrO$_3$, FIO$_2$, F$_3$IO, FIO$_3$, F$_3$IO$_2$, F$_5$IO, ClF$_3$O, I$_2$O$_4$F$_5$, F$_2$O, F$_2$O$_2$, Cl$_2$O, ClO$_2$, Cl$_2$O$_4$, Cl$_2$O$_6$, Cl$_2$O$_7$, Br$_2$O, Br$_3$O$_8$ or BrO$_3$, BrO$_2$, I$_2$O$_4$, I$_4$O$_9$, I$_2$O$_5$, Br$_2$O$_3$;
  v) An oxoacid and salts containing the anions thereof, such as HOF, OF$^-$, HOCl, HClO$_2^-$, HClO$_3$, ClO$^-$, ClO$_2^-$, ClO$_3^-$, HBrO, HBrO$_2$, HBrO$_3$, HBrO$_4$, BrO$^-$, BrO$_2^-$, BrO$_3^-$, BrO$_4^-$, HIO, HIO$_3$, HIO$_4$, IO$^-$, IO$_3^-$, IO$_4^-$, HAtO, HAtO$_3$, HAtO$_4$, AtO$_3^-$, AtO$_4^-$, AtO$^-$;
  vi) A hydrogen halide, such as HF, HCl, HBr, HI, HAt;
  vii) NH$_4$F, SF$_3$, SbF$_3$, AgF$_2$, KHF$_2$, ZnF$_2$, AsF$_3$, and salts containing the HF$_2^-$ anion;
  viii) A hydrohalic acid, such as HF$_{(aq)}$, HCl$_{(aq)}$, HBr$_{(aq)}$, HI$_{(aq)}$, HAt$_{(aq)}$;
e) A noble gas containing compound (a noble gas is an element of Group 18) selected from the following:
  i) A He, Ne, Ar, Kr, Xe, and Rn oxide, salts containing the cations thereof, and salts containing the anions thereof, such as XeO$_3$, XeO$_2$, XeO$_4$, XeO$_4^{2-}$, and XeO$_6^{4-}$;
  ii) A He, Ne, Ar, Kr, Xe, and Rn halide, salts containing the cations thereof, and salts containing the anions thereof, such as KrF$_2$, XeF$_2$, XeCl$_2$, XeF$_4$, XeF$_6$, KrF$^+$, Kr$_2$F$_3^+$, XeF+, XeF$_5^+$, Xe$_2$F$_3^+$, XeF$_7^-$, XeF$_8^{2-}$, Xe$_2$F$_{11}^+$;
  iii) A He, Ne, Ar, Kr, Xe, and Rn chalcogenyl halide, salts containing the cations thereof, and salts containing the anions thereof, such as XeOF$_4$, XeO$_2$F$_2$, XeO$_3$F$_2$, XeO$_3$F$^-$, XeOF$_3^+$, XeO$_2$F$^+$;
f) A product obtained by reacting a material selected from the group consisting of water, alcohol, hydrogen sulfide and a thiol with any compound selected from a) i-vii; b) i-x; c) i-xii; d) i-viii; e) i-iii; and salts thereof containing the corresponding anion;
g) An organic peroxide;
h) Water; and
i) Mixtures thereof.

In the process of the present invention it has been found suitable to add, generally, to the polymerization medium the compound(s) in an amount from about 1 ppm to about 10,000 ppm by molar ratio in the fluid phase(s) of the polymerization medium, in order to produce polyolefins having narrowed molecular weight distributions. The fluid phase may be gas or liquid phase.

In a further embodiment of the present invention it has been found suitable to add, generally, to the gas phase polymerization medium the compound(s) in an amount from about 1 ppm to about 10,000 ppm by volume, in order to produce polyolefins having narrowed molecular weight distributions.

Polyethylenes produced by the present process are not only characterized by narrower molecular weight distribution, but also, generally, a reduced n-hexane soluble polymeric fraction.

In carrying out the polymerization reaction of the present process there may be added other conventional additives generally utilized in processes for polymerizing olefins. Specifically there may be added any halogenated hydrocarbon, including those mentioned hereinbefore, and preferably, chloroform. Further, there may be added any external or internal electron donor, or mixtures of electron donors, such as those mentioned hereinbefore, and preferably, tetrahydrofuran.

There are also provided herein novel polyethylenes. These polyethylenes are homopolymers of ethylene and copolymers of ethylene and at least one or more alpha-olefins having 3 to 16 carbon atoms wherein ethylene comprises at least about 50% by weight of the total monomers involved.

The novel copolymers of ethylene and 1-hexene of the present invention, wherein ethylene comprises at least about 50% by weight of the copolymer, are further characterized by having a differential scanning calorimetry (DSC) melt transition temperature, $T_m$, of about 116° C. to about 123° C., a density of about 0.880 g/cc to about 0.930 g/cc, a n-hexane extractable of from 0 to about 6 weight percent, and a melt flow ratio of about 26 to about 34.

In a further embodiment the novel copolymers of ethylene and 1-hexene of the present invention are further characterized by having a DSC melt transition temperature, $T_m$, of about 119° C. to about 121° C., a density of about 0.905 g/cc to about 0.920 g/cc, a n-hexane extractable of from 0 to about 3 weight percent, and a melt flow ratio of about 26 to about 32.

In a further embodiment, there are provided herein novel copolymers of ethylene and an olefin having from 3 to 16 carbon atoms, wherein ethylene comprises at least 99% by weight of the copolymer, and the copolymer has a melt flow ratio of from about 22 to about 26.

In a still further embodiment herein, there are provided novel copolymers of ethylene and at least one or more olefin(s) having 5 to 16 carbon atoms, wherein ethylene comprises at least about 50% by weight of the copolymer, characterized by having a DSC melt transition temperature of about 116° C. to about 123° C., a density of from about 0.880 g/cc to about 0.930 g/cc, a n-hexane extractable of from 0 to about 6 weight percent, and a melt flow ratio of from about 26 to about 34.

Any conventional additive may be added to the polyolefins obtained by the present invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, antifogging agents, dyes, pigments, natural oils, synthetic oils, waxes, fillers and rubber ingredients.

The novel polyethylenes of the present invention may be fabricated into films by any technique known in the art. For example, films may be produced by the well known cast film, blown film and extrusion coating techniques.

Further, the novel polyethylenes may be fabricated into other articles of manufacture, such as molded articles, by any of the well known techniques.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the analytical properties of the polyolefins herein and in evaluating the physical properties of the films of the examples.

a) Dart Impact is determined according to ASTM D-1709, Method A; with a 38.1 mm dart, and a drop height of 0.66 meter. Film thickness of about 1 mil;

b) Density is determined according to ASTM D-4883 from a plaque made according to ASTM D1928;

c) Melt Index (MI), $I_2$, is determined in accord with ASTM D-1238, condition E, measured at 190° C., and reported as decigrams per minute;

d) High Load Melt Index (HLMI), $I_{21}$, is measured in accord with ASTM D-1238, Condition F, measured at 10.0 times the weight used in the melt index test above;

e) Melt Flow Ratio (MFR)=$I_{21}/I_2$ or High Load Melt Index/Melt Index; and f) n-Hexane Extractable—is determined in accordance with 21 CFR 177.1520 (Option 2). More particularly, an approximately 1 square inch film test specimen having a thickness $\geq 4$ mils weighing 2.5±0.05 grams is placed into a tared sample basket and accurately weighed to the nearest 0.1 milligram. The sample basket containing the test specimen is then placed in a 2-liter extraction vessel containing approximately 1 liter of n-hexane. The basket is placed such that it is totally below the level of n-hexane solvent. The sample resin film is extracted for 2 hours at 49.5±0.5° C. and then the basket is raised above the solvent level to drain momentarily. The basket is removed and the contents are rinsed by immersing several times in fresh n-hexane. The basket is allowed to dry between rinsing. The excess solvent is removed by briefly blowing the basket with a stream of nitrogen or dry air. The basket is placed in the vacuum oven for 2 hours at 80±5° C. After 2 hours, it is removed and placed in a desiccator to cool to room temperature (about 1 hour). After cooling, the basket is reweighed to the nearest 0.1 milligram. The percent n-hexane extractables content is then calculated from the weight loss of the original sample.

g) DSC Melt Transition Temperature ($T_M$) was determined according to ASTM D-3418-97. The transition, $T_M$, was measured on the second heat cycle.

The Ziegler-Natta catalyst used in Examples 1-7 herein was prepared in accordance with Example 1-a of European Patent Application EP 0 703 246 A1.

The prepolymer used in Examples 1-7 herein was prepared in accordance with Example 1-b of European Patent Application EP 0 703 246 A1. A prepolymer containing about 34 grams of polyethylene per millimole of titanium, with a tri-n-octylaluminum (TnOA) to titanium molar ratio of about 1.1, was thus obtained.

The polymerization process utilized in Examples 1-7 herein was carried out in a fluidized-bed reactor for gas-phase polymerization, consisting of a vertical cylinder of diameter 0.74 meters and height 7 meters and surmounted by a velocity reduction chamber. The reactor is provided in its lower part with a fluidization grid and with an external line for recycling gas, which connects the top of the velocity reduction chamber to the lower part of the reactor, at a point below the fluidization grid. The recycling line is equipped with a compressor for circulating gas and a heat transfer means such as a heat exchanger. In particular the lines for supplying ethylene, 1-hexene, hydrogen and nitrogen, which represent the main constituents of the gaseous reaction mixture passing through the fluidized bed, feed into the recycling line.

Above the fluidization grid, the reactor contains a fluidized bed consisting of about 800 pounds of a low-density polyethylene powder made up of particles with a weight-average diameter of about 0.7 mm. The gaseous reaction mixture, which contains ethylene, 1-hexene, hydrogen, nitrogen and minor amounts of other components, passes through the fluidized bed under a pressure of about 295 psig with an ascending fluidization speed of about 1.9 ft/s.

A catalyst is introduced intermittently into the reactor, the said catalyst comprising magnesium, chlorine and titanium and having been converted beforehand to a prepolymer, as described above, containing about 34 grams of polyethylene per millimole of titanium and an amount of tri-n-octylaluminum (TnOA) such that the molar ratio, Al/Ti, is equal to about 1.1. The rate of introduction of the prepolymer into the reactor is adjusted to achieve the desired production rate. During the polymerization, a solution of trimethylaluminum (TMA) in n-hexane, at a concentration of about 2 weight percent, is introduced continuously into the line for recycling the gaseous reaction mixture, at a point situated downstream of the heat transfer means. The feed rate of TMA is expressed as a molar ratio of TMA to titanium (TMA/Ti), and is defined as the ratio of the TMA feed rate (in moles of TMA per hour) to the prepolymer feed rate (in moles of titanium per hour). Simultaneously, a solution of chloroform ($CHCl_3$) in n-hexane, at a concentration of about 0.5 weight percent, is introduced continuously into the line for recycling the gaseous reaction mixture. The feed rate of $CHCl_3$ is expressed as a molar ratio of $CHCl_3$ to titanium ($CHCl_3$/Ti), and is defined as the ratio of the $CHCl_3$ feed rate (in moles of $CHCl_3$ per hour) to the prepolymer feed rate (in moles of titanium per hour). Likewise, a solution of tetrahydrofuran (THF) in n-hexane, at a concentration of about 1 weight percent, can be introduced continuously into the line for recycling the gaseous reaction mixture. The feed rate of THF is expressed as a molar ratio of THF to titanium (THF/Ti), and is defined as the ratio of the THF feed rate (in moles of THF per hour) to the prepolymer feed rate (in moles of titanium per hour). Furthermore, the compound added to narrow the molecular weight distribution of the polyolefin, depending on its physical state, can be added as a gas, liquid or as a solution in a suitable solvent into the line for recycling the gaseous reaction mixture or directly into the reactor. In Examples 3-7 herein, dinitrogen monoxide ($N_2O$) was added as a gas to the line for recycling the gaseous reaction mixture in amounts to narrow the molecular weight distribution of the polyethylene. The concentration of $N_2O$ in the gas phase polymerization medium is expressed in units of parts per million (ppm) by volume. Polyethylenes of ethylene and 1-hexene, having densities of 0.917 g/cc, were manufactured at a rate of about 150 to about 200 pounds per hour in the following examples.

The productivity of the prepolymer (Productivity) is the ratio of pounds of polyethylene produced per pound of prepolymer added to the reactor. The activity of the catalyst is expressed as grams of polyethylene per millimole titanium per hour per 100 psia of ethylene pressure.

Example 1

The gas phase process conditions are given in Table 1 and the resin properties are given in Table 2. The molar ratio of trimethylaluminum (TMA) to titanium (TMA/Ti) was 3. The molar ratio of chloroform ($CHCl_3$) to titanium ($CHCl_3$/Ti) was 0.03. The operation was conducted without the addition of an external electron donor. 1-Hexene was used as comonomer. Under these conditions a polyethylene free from agglomerate was withdrawn from the reactor at a rate of 150 lb/h (pounds per hour). The productivity of the prepolymer was 375 pounds of polyethylene per pound of prepolymer which corresponds to an activity of 2311 grams of polyethylene per millimole of titanium per hour per 100 psia of ethylene partial pressure [$gPE/(mmoleTi \cdot h \cdot 100P_{C2})$].

The polyethylene had a density of 0.917 g/cc and a melt index $MI_{2.16}$, $I_2$, of 0.9 dg/min. The Melt Flow Ratio, $I_{21}/I_2$, was 33 and the n-hexane extractables were 2.6% by weight. The DSC melt transition temperature ($T_m$) was 124.5° C.

Example 2

The gas phase process conditions are given in Table 1 and the resin properties are given in Table 2. The molar ratio TMA/Ti was 7. The molar ratio $CHCl_3$/Ti was 0.06. The molar ratio of tetrahydrofuran (THF) to titanium (THF/Ti) was 1. 1-Hexene was used as comonomer. Under these conditions a polyethylene free from agglomerate was withdrawn from the reactor at a rate of 192 lb/h. The productivity of the prepolymer was 231 pounds of polyethylene per pound of prepolymer which corresponds to an activity of 1800 [$gPE/(mmoleTi \cdot h \cdot 100P_{C2})$].

The polyethylene had a density of 0.917 g/cc and a melt index $MI_{2.16}$, $I_2$, of 0.9 dg/min. The Melt Flow Ratio, $I_{21}/I_2$, was 31 and the n-hexane extractables were 2.0% by weight. The DSC melt transition temperature ($T_m$) was 123.9° C.

Example 3

The gas phase process conditions are given in Table 1 and the resin properties are given in Table 2. The molar ratio TMA/Ti was 7. The molar ratio $CHCl_3$/Ti was 0.06. The molar ratio THF/Ti was 1. The concentration of dinitrogen monoxide ($N_2O$) in the polymerization medium was 70 ppm by volume. 1-Hexene was used as comonomer. Under these conditions a polyethylene free from agglomerate was withdrawn from the reactor at a rate of 180 lb/h. The productivity of the prepolymer was 79 pounds of polyethylene per pound of prepolymer which corresponds to an activity of 609 [$gPE/(mmoleTi \cdot h \cdot 100P_{C2})$].

The polyethylene had a density of 0.917 g/cc and a melt index $MI_{2.16}$, $I_2$, of 0.9 dg/min. The Melt Flow Ratio, $I_{21}/I_2$, was 28 and the n-hexane extractables were 1.1% by weight. The DSC melt transition temperature ($T_m$) was 122.3° C.

Example 4

The gas phase process conditions are given in Table 1 and the resin properties are given in Table 2. The molar ratio TMA/Ti was 7. The molar ratio $CHCl_3$/Ti was 0.06. The molar ratio THF/Ti was 0. The concentration of $N_2O$ in the polymerization medium was 130 ppm by volume. 1-Hexene was used as comonomer. Under these conditions a polyethylene free from agglomerate was withdrawn from the reactor at a rate of 211 lb/h. The productivity of the prepolymer was 121 pounds of polyethylene per pound of prepolymer which corresponds to an activity of 1116 [$gPE/(mmoleTi \cdot h \cdot 100P_{C2})$].

The polyethylene had a density of 0.917 g/cc and a melt index $MI_{2.16}$, $I_2$, of 0.9 dg/min. The Melt Flow Ratio, $I_{21}/I_2$, was 28 and the n-hexane extractables were 1.6% by weight. The DSC melt transition temperature ($T_m$) was 122.7° C.

Example 5

The gas phase process conditions are given in Table 1 and the resin properties are given in Table 2. The molar ratio TMA/Ti was 7. The molar ratio $CHCl_3$/Ti was 0.06. The molar ratio THF/Ti was 0. The concentration of $N_2O$ in the polymerization medium was 210 ppm by volume. 1-Hexene was used as comonomer. Under these conditions a polyethylene free from agglomerate was withdrawn from the reactor at a rate of 194 lb/h. The productivity of the prepolymer was 124 pounds of polyethylene per pound of prepolymer which corresponds to an activity of 1038 [gPE/(mmoleTi·h·100$P_{C2}$)].

The polyethylene had a density of 0.917 g/cc and a melt index $MI_{2.16}$, $I_2$, of 0.9 dg/min. The Melt Flow Ratio, $I_{21}/I_2$, was 28 and the n-hexane extractables were 1.1% by weight. The DSC melt transition temperature ($T_m$) was 122.2° C.

Example 6

The gas phase process conditions are given in Table 1 and the resin properties are given in Table 2. The molar ratio TMA/Ti was 7. The molar ratio $CHCl_3$/Ti was 0.06. The molar ratio THF/Ti was 0.3. The concentration of $N_2O$ in the polymerization medium was 300 ppm by volume. 1-Hexene was used as comonomer. Under these conditions a polyethylene free from agglomerate was withdrawn from the reactor at a rate of 192 lb/h. The productivity of the prepolymer was 83 pounds of polyethylene per pound of prepolymer which corresponds to an activity of 471 [gPE/(mmoleTi·h·100$P_{C2}$)].

The polyethylene had a density of 0.917 g/cc and a melt index $MI_{2.16}$, $I_2$, of 0.9 dg/min. The Melt Flow Ratio, $I_{21}/I_2$, was 27 and the n-hexane extractables were 0.8% by weight. The DSC melt transition temperature ($T_m$) was 120.0° C.

Example 7

The gas phase process conditions are given in Table 1 and the resin properties are given in Table 2. The molar ratio TMA/Ti was 7. The molar ratio $CHCl_3$/Ti was 0.06. The molar ratio THF/Ti was 0.3. The concentration of $N_2O$ in the polymerization medium was 300 ppm by volume. 1-Hexene was used as comonomer. Under these conditions a polyethylene free from agglomerate was withdrawn from the reactor at a rate of 174 lb/h. The productivity of the prepolymer was 91 pounds of polyethylene per pound of prepolymer which corresponds to an activity of 470 [gPE/(mmoleTi·h·100$P_{C2}$)].

The polyethylene had a density of 0.917 g/cc and a melt index $MI_{2.16}$, $I_2$, of 0.6 dg/min. The Melt Flow Ratio, $I_{21}/I_2$, was 28 and the n-hexane extractables were 0.5% by weight. The DSC melt transition temperature ($T_m$) was 119.5° C.

TABLE 1

Reactor Conditions for Examples 1 through 7

| | Example | | | | | | |
|---|---|---|---|---|---|---|---|
| | 1 | 2 | 3 | 4 | 5 | 6 | 7 |
| Reactor Pressure (psig) | 290 | 296 | 295 | 294 | 295 | 297 | 296 |
| Reactor Temperature (° C.) | 84 | 84 | 84 | 84 | 84 | 86 | 86 |
| Fluidization Velocity (ft/sec) | 1.8 | 1.9 | 1.9 | 1.9 | 1.9 | 1.8 | 1.8 |
| Fluidized Bulk Density (lb/ft$^3$) | 17.0 | 17.8 | 17.1 | 17.5 | 16.7 | 15.2 | 14.9 |
| Reactor Bed Height (ft) | 9.4 | 10.2 | 10.2 | 10.0 | 10.4 | 12.8 | 12.9 |
| Ethylene (mole %) | 38 | 32 | 32 | 32 | 32 | 41 | 41 |
| H2/C2 (molar ratio) | 0.178 | 0.157 | 0.140 | 0.113 | 0.110 | 0.080 | 0.063 |
| C6/C2 (molar ratio) | 0.191 | 0.153 | 0.138 | 0.128 | 0.124 | 0.115 | 0.112 |
| TMA/Ti (molar ratio) | 3 | 7 | 7 | 7 | 7 | 7 | 7 |
| $CHCl_3$/Ti | 0.03 | 0.06 | 0.06 | 0.06 | 0.06 | 0.06 | 0.06 |
| THF/Ti (molar ratio) | 0 | 1 | 1 | 0 | 0 | 0.3 | 0.3 |
| $N_2O$ (ppm by volume) | 0 | 0 | 70 | 130 | 210 | 300 | 300 |
| Prepolymer Rate (lb/h) | 0.4 | 0.83 | 2.29 | 1.74 | 1.56 | 2.30 | 1.92 |
| Production Rate (lb/h) | 150 | 192 | 180 | 211 | 194 | 192 | 174 |
| Productivity (mass ratio) | 375 | 231 | 79 | 121 | 124 | 83 | 91 |
| Space Time Yield (lb/h·ft$^3$) | 3.6 | 4.0 | 3.8 | 4.6 | 4.0 | 3.2 | 2.9 |
| Activity* | 2311 | 1800 | 609 | 1116 | 1038 | 471 | 470 |
| Residual Titanium (ppm) | 3.8 | 5.9 | 17.5 | 11.3 | 11.0 | 16.9 | 15.6 |

*units of grams PE/(mmoleTi·h·100$P_{C2}$)

TABLE 2

Resin Properties for LLDPE prepared in Examples 1 through 7

| | Example | | | | | | |
|---|---|---|---|---|---|---|---|
| | 1 | 2 | 3 | 4 | 5 | 6 | 7 |
| Density (g/cc) | 0.917 | 0.917 | 0.917 | 0.917 | 0.917 | 0.917 | 0.917 |
| Melt Index, $I_2$ (dg/min) | 0.9 | 0.9 | 0.9 | 0.9 | 0.9 | 0.9 | 0.6 |
| Melt Flow Ratio ($I_{21}/I_2$) | 33 | 31 | 28 | 28 | 28 | 27 | 28 |
| n-Hexane Extractable (wt %) | 2.9 | 2.0 | 1.1 | 1.6 | 1.1 | 0.8 | 0.5 |
| DSC Melt Trans., $T_M$ (° C.) | 124.5 | 123.9 | 122.3 | 122.7 | 122.2 | 120.0 | 119.5 |
| Dart Impact (g/mil) | 200 | 330 | 380 | 400 | 580 | 1750 | >2000 |

From the above data in the Examples and Tables 1 and 2 the following observations may be made. The addition of $N_2O$ caused a narrowing of the molecular weight distribution as evidenced by the reduction in the melt flow ratio ($I_{21}/I_2$) values, caused a reduction in the n-hexane soluble polymeric fraction (wt % extractable), and caused a reduction in the DSC melt transition temperature ($T_m$) of the polyethylenes.

The combination of narrowed molecular weight distribution, reduced n-hexane extractables, and reduced DSC melt transition temperature ($T_m$) is indicative of a reduction of the compositional heterogeneity in the polyethylene.

Films prepared from the polyethylenes of the present invention are generally characterized as having improved optical properties and improved strength properties which are particularly shown by the values of Dart Impact in Table 2.

Articles such as molded items can also be prepared from the polyethylenes of the present invention.

In similar fashion polyolefins may be produced using any of the other compounds described herein. It is expected that the resultant polyolefins will likewise exhibit narrowed molecular weight distributions.

It is also expected that the activity of a given Ziegler-Natta catalyst can either increase or decrease upon the addition of the compounds described herein depending on the transition metal, the co-catalyst type, the olefin type, the polymerization medium, the polymerization conditions, and the particular compound added to narrow the molecular weight distribution.

It should be clearly understood that the forms of the invention herein described are illustrative only and are not intended to limit the scope of the invention. The present invention includes all modifications falling within the scope of the following claims.

We claim:

1. A copolymer of ethylene and 1-hexene, wherein ethylene comprises at least about 50 weight % of the copolymer, characterized by having a differential scanning calorimetry melt transition temperature of about 116° C. to 122.7° C., a density of 0.917 g/cc, a n-hexane extractable of from 0 to 1.6 weight %, and a melt flow ratio of from about 26 to 28.

2. The copolymer according to claim 1, wherein the differential scanning calorimetry melt transition temperature is from 119.5° C. to 122.3° C., and the n-hexane extractable is from 0.5 to 1.1 weight %.

3. The copolymer according to claim 1 wherein the differential scanning calorimetry melt transition temperature is 120° C., the n-hexane extractable is 0.8 weight %, and the melt flow ratio is 27.

4. The copolymer according to claim 1 wherein the differential scanning calorimetry melt transition temperature is 119.5° C., the n-hexane extractable is 0.5 weight %, and the melt flow ratio is 28.

* * * * *